United States Patent
Oyama et al.

(10) Patent No.: US 9,682,438 B2
(45) Date of Patent: Jun. 20, 2017

(54) STEAM REFLOW APPARATUS AND STEAM REFLOW METHOD

(71) Applicants: SS TECHNO, INC., Ogoori-shi, Fukuoka (JP); KNE KABUSHIKI KAISHA, Fukuoka-shi, Fukuoka (JP)

(72) Inventors: Kenshu Oyama, Ogoori (JP); Kazuhide Nagao, Fukuoka (JP)

(73) Assignees: SS TECHNO, INC., Ogoori-Shi (JP); KNE KABUSHIKI KAISHA, Fukuoka-Shi (JP)

( * ) Notice: Subject to any disclaimer, the term of this patent is extended or adjusted under 35 U.S.C. 154(b) by 0 days.

(21) Appl. No.: 14/966,602

(22) Filed: Dec. 11, 2015

(65) Prior Publication Data

US 2016/0167148 A1    Jun. 16, 2016

(30) Foreign Application Priority Data

Dec. 12, 2014    (JP) .................................. 2014-251430

(51) Int. Cl.
*B23K 31/02*    (2006.01)
*B23K 1/015*    (2006.01)
(Continued)

(52) U.S. Cl.
CPC ............ *B23K 1/015* (2013.01); *B23K 1/0016* (2013.01); *B23K 1/012* (2013.01); *B23K 37/003* (2013.01)

(58) Field of Classification Search
CPC ...... B23K 1/012; B23K 1/015; B23K 1/0016; B23K 37/003; B23K 2201/36–2201/42
(Continued)

(56) References Cited

U.S. PATENT DOCUMENTS 4,558,524 A * 12/1985 Peck ...................... B23K 1/015
                                                                134/104.4
4,565,917 A *  1/1986 Furtek .................. B23K 1/0053
                                                                219/388
(Continued)

FOREIGN PATENT DOCUMENTS

DE    102009049270 A1 *  4/2011 ............. B23K 1/015
EP         1036626 A2 *  9/2000 ............. B23K 1/015
(Continued)

OTHER PUBLICATIONS

Japanese Office Action with English Translation dispatched on Nov. 29, 2016, 6 pages.

*Primary Examiner* — Kiley Stoner
(74) *Attorney, Agent, or Firm* — Rankin, Hill & Clark LLP

(57) ABSTRACT

A steam reflow apparatus includes a heating furnace including a preheating zone, a uniform heating zone, a melting zone and a cooling zone to which superheated steams are respectively supplied. The apparatus further includes a furnace-inlet-side dew condensation prevention zone and a furnace-outlet-side dew condensation prevention zone, to which air or nitrogen gas with 100° C. or higher heated by a heater is supplied, respectively adjacently provided with an upstream side of the preheating zone and a downstream side of the cooling zone. Atmospheric pressures of the furnace-inlet-side dew condensation prevention zone and the furnace-outlet-side dew condensation prevention zone are higher than atmospheric pressures of the preheating zone and the cooling zone.

6 Claims, 3 Drawing Sheets

(51) Int. Cl.
   *B23K 1/012* (2006.01)
   *B23K 1/00* (2006.01)
   *B23K 37/00* (2006.01)

(58) Field of Classification Search
   USPC .......................... 228/233.2, 43, 234.2, 47.1
   See application file for complete search history.

(56) References Cited

U.S. PATENT DOCUMENTS

| | | | | |
|---|---|---|---|---|
| 4,580,716 A | * | 4/1986 | Barresi | B23K 35/386 228/180.1 |
| 4,628,616 A | * | 12/1986 | Shirai | B23K 1/015 134/11 |
| 4,634,000 A | * | 1/1987 | Plapp | B23K 1/015 198/800 |
| 4,697,730 A | * | 10/1987 | Spigarelli | B23K 3/0653 228/234.2 |
| 4,698,915 A | * | 10/1987 | Dickinson | B23K 1/015 134/11 |
| 4,735,001 A | * | 4/1988 | Mishina | B23K 1/015 118/61 |
| 4,747,218 A | * | 5/1988 | Saint Martin | B23K 1/015 134/31 |
| 4,762,264 A | * | 8/1988 | Peck | B23K 1/015 228/180.1 |
| 4,766,677 A | * | 8/1988 | Brooks | B23K 1/015 34/242 |
| 4,767,471 A | * | 8/1988 | McLellan | B23K 35/26 148/24 |
| 4,771,929 A | * | 9/1988 | Bahr | B23K 1/0053 219/85.13 |
| 4,776,105 A | * | 10/1988 | Mishina | H05K 13/0465 34/242 |
| 4,801,069 A | * | 1/1989 | Ankrom | B23K 1/015 228/180.21 |
| 4,809,443 A | * | 3/1989 | Mishina | H05K 3/3489 134/11 |
| 4,833,301 A | * | 5/1989 | Furtek | B23K 1/0053 219/388 |
| 4,838,476 A | * | 6/1989 | Rahn | B23K 1/015 134/107 |
| 4,996,781 A | * | 3/1991 | Mishina | B23K 1/012 118/61 |
| 5,038,496 A | * | 8/1991 | Mishina | B23K 1/015 34/231 |
| 5,146,694 A | * | 9/1992 | Mishina | B23K 1/015 118/61 |
| 5,156,325 A | * | 10/1992 | Mishina | B23K 1/015 228/219 |
| 5,333,774 A | * | 8/1994 | Mishina | B23K 1/015 219/388 |
| 5,542,596 A | * | 8/1996 | Cimbak | B23K 1/015 228/234.2 |
| 5,993,500 A | * | 11/1999 | Bailey | B23K 1/008 228/42 |
| 6,484,926 B2 | | 11/2002 | Bell | |
| 2002/0007565 A1 | * | 1/2002 | Bell | B23K 1/015 34/60 |
| 2002/0130164 A1 | | 9/2002 | Matsuki et al. | |
| 2003/0218058 A1 | * | 11/2003 | Shaw | B23K 1/012 228/230 |
| 2005/0173497 A1 | * | 8/2005 | Dokkedahl | B23K 1/015 228/219 |
| 2007/0284408 A1 | * | 12/2007 | Asai | B23K 1/0016 228/42 |
| 2008/0295686 A1 | * | 12/2008 | Neiderman | B23K 1/008 95/39 |
| 2010/0308103 A1 | * | 12/2010 | Chou | B23K 1/0016 228/125 |
| 2012/0043305 A1 | * | 2/2012 | Kelly | B23K 1/0016 219/121.64 |
| 2013/0200136 A1 | * | 8/2013 | Besshi | B23K 1/0016 228/219 |
| 2013/0333808 A1 | * | 12/2013 | Shimizu | C21D 1/06 148/230 |
| 2013/0344451 A1 | * | 12/2013 | Gardin | B30B 11/002 432/29 |
| 2014/0290286 A1 | * | 10/2014 | Liebert | B23K 1/0016 62/63 |

FOREIGN PATENT DOCUMENTS

| | | | |
|---|---|---|---|
| JP | 63-217129 A | * | 9/1988 |
| JP | 07159307 A | * | 6/1995 |
| JP | 2001-015447 | | 1/2001 |
| JP | 2002-210555 | | 7/2002 |
| JP | 2002-263832 | | 9/2002 |
| JP | 2007160322 A | * | 6/2007 |
| JP | 2007266176 A | * | 10/2007 |
| JP | 2007273571 A | * | 10/2007 |
| JP | 2008-270499 | | 11/2008 |
| JP | 2008270499 A | * | 11/2008 |
| JP | 2011-082282 | | 4/2011 |
| JP | 2011082282 A | * | 4/2011 |
| JP | WO 2014203499 A1 | * | 12/2014 ............ B23K 1/008 |

\* cited by examiner

STEAM REFLOW APPARATUS AND STEAM REFLOW METHOD

CROSS REFERENCE TO RELATED APPLICATION(S)

This application is based upon and claims the benefit of priority of Japanese Patent Application No. 2014-251430 filed on Dec. 12, 2014, the contents of which are incorporated herein by reference in its entirety.

BACKGROUND OF THE INVENTION

1. Field of the Invention

The present invention relates to a steam reflow apparatus and a steam reflow method for soldering an electronic component mounted on a substrate by high-temperature superheated steam.

2. Description of the Related Art

A heated body such as a substrate on which an electronic component is mounted is fed to a reflow apparatus, and soldering is performed on the heated body. Such heated body may be collectively called a "substrate". A heating furnace of the conventional reflow apparatus includes a preheating zone, a uniform heating zone, a melting zone, and a cooling zone. While the substrate is conveyed by a conveyor, the substrate is heated from ordinary temperature to about 150° C. or higher in the preheating zone, and is fed to the uniform heating zone. After the substrate is heated for a while at about 150° C. or higher in the uniform heating zone, the substrate is fed to the melting zone. Then, the substrate is rapidly heated to about 230° C. higher than or equal to a solder melting point (about 219° C. though the melting point varies depending on a kind of solder) in the melting zone, and the solder is melted. Then, after the substrate is fed to the cooling zone and is cooled by a fan or the like and the melted solder is solidified, the substrate is carried out to the outside of the heating furnace.

When the substrate is heated in the heating furnace as described above in air reflow, a surface of solder is oxidized by oxygen in air activated at a high temperature, and wettability of the solder is decreased. Hence, nitrogen reflow for filling the inside of the heating furnace with nitrogen gas which is inert gas and performing soldering is known. The nitrogen reflow can prevent oxidation of the surface of the solder even when the substrate is heated at the high temperature. However, the nitrogen reflow has a problem of increasing a cost since a large amount of nitrogen gas is consumed.

Hence, instead of the nitrogen reflow, steam reflow for performing soldering by superheated steam (hereinafter simply called "steam") with a high temperature of 100° C. or higher is proposed (JP-A-2008-270499 and JP-A-2011-82282 as Patent References 1 and 2).

Patent Reference 1: JP-A-2008-270499
Patent Reference 2: JP-A-2011-82282

SUMMARY OF THE INVENTION

Since inexpensive water has only to be heated to change the water into steam in the steam reflow, the steam reflow can be implemented at much lower cost than that of the nitrogen reflow. However, the steam reflow is not yet put to practical use. One of the main reasons is because a problem of dew condensation is not solved. In particular, the problem is as follows. As described above, in the heating furnace of the reflow apparatus, the substrate is rapidly heated from ordinary temperature to about 150° C. or higher. In that case (that is, the case of moving the substrate in the heating furnace), when superheated steam with a high temperature above 100° C. which is a dew condensation boundary temperature touches the substrate with the ordinary temperature (for example, about 20° C.), the steam is liquefied on a surface of the substrate to cause dew condensation, and the dew condensation deteriorates, for example, solder, an electrode on the substrate and an electronic component mounted on the substrate. Also, dew condensation water enters the inside of the substrate and is vaporized by subsequent heating, and its volume expansion may destroy the substrate.

Also, after solder is melted at about 230° C. by the high-temperature steam in the melting zone, the substrate is cooled in the cooling zone to solidify the solder and the substrate is carried out of the heating furnace. In that case (that is, the case of moving the substrate out of the heating furnace), when the steam with 100° C. or higher flowing out of a furnace outlet touches the substrate having residual heat with 100° C. or higher, the steam is liquefied on the surface of the substrate to cause dew condensation, and the dew condensation deteriorates, for example, the solder, the electrode on the substrate and the electronic component soldered on the substrate. Because of the problem of dew condensation as described above, it is in the present state in which the steam reflow is not yet put to practical use.

Hence, the present invention can solve the problem of dew condensation at the time of moving the substrate in and out of the furnace as described above, and a non-limited object of one or more aspects of the present invention is to provide a steam reflow apparatus and a steam reflow method using superheated steam capable of being put to practical use.

A steam reflow apparatus includes a heating furnace including a preheating zone, a uniform heating zone, a melting zone and a cooling zone to which superheated steams are respectively supplied; a substrate conveyor which conveys a substrate inside the heating furnace, wherein an electronic component on an electrode of the substrate is soldered while the substrate is conveyed; a furnace-inlet-side dew condensation prevention zone and a furnace-outlet-side dew condensation prevention zone respectively adjacently provided with an upstream side of the preheating zone and a downstream side of the cooling zone, wherein air or nitrogen gas with 100° C. or higher heated by a heater is supplied to the furnace-inlet-side dew condensation prevention zone and the furnace-outlet-side dew condensation prevention zone, and an atmospheric pressure of the furnace-inlet-side dew condensation prevention zone having an inlet of the substrate and an atmospheric pressure of the furnace-outlet-side dew condensation prevention zone having an outlet of the substrate are set higher than an atmospheric pressure of the preheating zone and an atmospheric pressure of the cooling zone.

A steam reflow method includes soldering while conveying a substrate, on which an electronic component is mounted, with the following procedures: heating a substrate, on which an electronic component is mounted, carried in from an inlet to 100° C. or higher by air or nitrogen gas heated by a heater to achieve a furnace-inlet-side dew condensation prevention; heating the substrate by superheated steam with 100° C. or higher heated by a heater to achieve a preheating; further heating the substrate to 150° C. or higher by superheated steam heated by a heater to achieve a uniform heating; heating the substrate to a solder melting temperature or higher by superheated steam heated by a heater and melting solder to achieve a melting; cooling the substrate by superheated steam heated by a heater to achieve a cooling; cooling the substrate by air or nitrogen gas heated by a heater to achieve a furnace-outlet-side dew condensation prevention; and carrying the substrate out of an outlet, and an atmospheric pressure during the furnace-inlet-side dew condensation prevention and an atmospheric pressure during the furnace-outlet-side dew condensation prevention are set higher than an atmospheric pressure of the preheating and an atmospheric pressure of the cooling.

According to the aspects of the present invention, in the case of moving the substrate in and out of the heating furnace, the steam touching the substrate can be prevented from becoming 100° C. or lower to cause dew condensation, with the result that practicable steam reflow can be implemented.

Also, the atmospheric pressure of the furnace-inlet-side dew condensation prevention zone and the atmospheric pressure of the furnace-outlet-side dew condensation prevention zone are set higher than the atmospheric pressure of the preheating zone and the atmospheric pressure of the cooling zone and thereby, a situation in which the steams of the preheating zone and the cooling zone leak from the inlet of the furnace-inlet-side dew condensation prevention zone and the outlet of the furnace-outlet-side dew condensation prevention zone to the outside of the heating furnace and the steams touch an outer surface of the heating furnace to cause dew condensation and this outer surface is waterlogged and is wetted can be prevented.

DETAILED DESCRIPTION OF THE EXEMPLARY EMBODIMENTS

Figure 1:
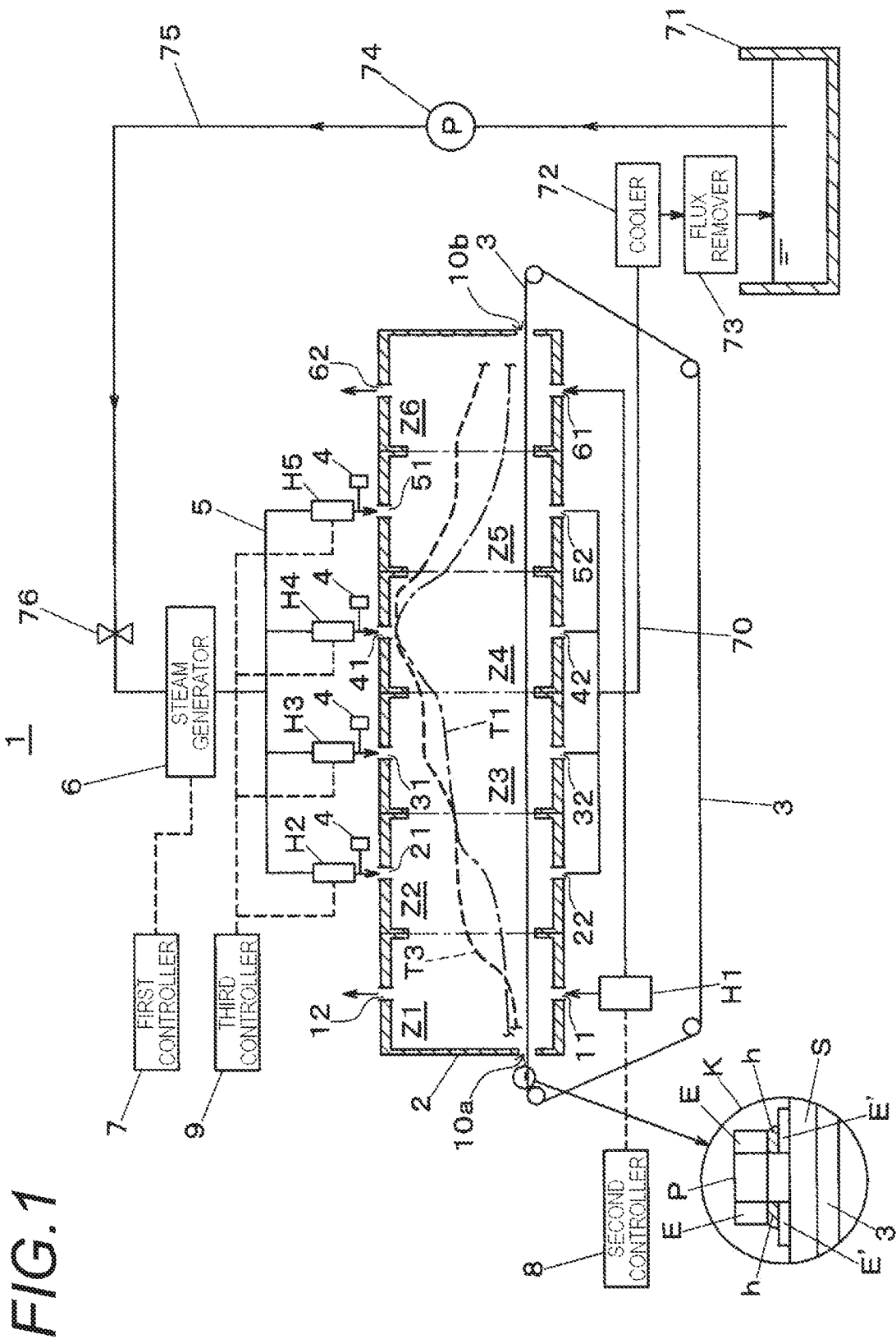
FIG. 1 is a schematic side view of a steam reflow apparatus in one embodiment of the present invention.

In FIG. 1, a steam reflow apparatus 1 mainly includes a heating furnace 2. The inside of the heating furnace 2 adjacently includes a plurality of zones having a first zone (an air preliminary heating zone as a furnace-inlet-side dew condensation prevention zone) Z1, a second zone (a first superheated steam preliminary heating zone as a preheating zone) Z2, a third zone (a second superheated steam preliminary heating zone as a uniform heating zone) Z3, a fourth zone (a third superheated steam preliminary heating zone as a melting zone) Z4, a fifth zone (a fourth superheated steam cooling zone as a cooling zone) Z5, and a sixth zone (an air cooling zone as a furnace-outlet-side dew condensation prevention zone) Z6 sequentially from the upstream side toward the downstream side of a substrate conveyance path. FIG. 1 shows a schematic side view of the steam reflow apparatus.

The inside of the heating furnace 2 is provided with a conveyor 3 configuring substrate conveyance means. While the conveyor 3 conveys a substrate S inside the heating furnace 2 from the first zone Z1 of the upstream side to the sixth zone Z6 of the downstream side, soldering is performed on the substrate.

As shown in a partially enlarged view K of FIG. 1, an electronic component P is mounted on an upper surface of the substrate S in an electronic component mounting step as a previous step. Electrodes E of both sides of the electronic component P are attached to electrodes E' formed on a surface of the substrate S by solder h such as paste-like solder. For example, lead-free solder is used as the solder. After the substrate S on which the electronic component P is mounted is carried in the first zone Z1 from an inlet 10a formed in the front of the first zone Z1 and is conveyed inside each of the zones Z1 to Z6, the substrate S is carried out of an outlet 10b formed in the back of the sixth zone Z6. Hereinafter, each of the zones Z1 to Z6 will be described sequentially.

The lower side of the heating furnace 2 is provided with a first heater H1 which is an air heating device, and air with a high temperature of 100° C. or higher (for example, about 120° C.) is fed and supplied from an opening 11 of a lower surface of the first zone Z1, and is discharged from an opening 12 of an upper surface. Consequently, the first zone Z1 forms the air preliminary heating zone as the furnace-inlet-side dew condensation prevention zone in which the substrate S carried in by the conveyor 3 and moved in the heating furnace 2 is heated from ordinary temperature to 100° C., which is a dew condensation (liquefaction) boundary temperature of steam, or higher (about 120° C.).

The downstream side of the first zone Z is adjacently provided with the second zone (the first superheated steam preliminary heating zone) Z2, the third zone (the second superheated steam preliminary heating zone) Z3, the fourth zone (the melting zone) Z4, the fifth zone (the superheated steam cooling zone) Z5 and the sixth zone (the air cooling zone) Z6 sequentially from the upstream side toward the downstream side of the substrate conveyance path. The outsides of the second zone Z2 to the fifth zone Z5 which are the superheated steam zones are respectively provided with a second heater H2, a third heater H3, a fourth heater H4 and a fifth heater H5. The delivery sides of superheated steams of the second heater H2 to the fifth heater H5 are respectively provided with temperature sensors 4, and the temperature sensors 4 measure temperatures of the superheated steams delivered from these heaters.

Openings 21, 31, 41, 51 are respectively opened in upper surfaces of the second zone Z2 to the fifth zone Z5. The second heater H2 feeds and supplies steam with about 120° C. (that is, steam with a temperature similar to that of the air heated by the first heater H1 and supplied to the first zone Z1) from the opening 21 to the second zone Z2. The third heater H3 supplies steam with a higher temperature (for example, about 180° C.) from the opening 31 to the third zone Z3. The fourth heater H4 feeds and supplies steam with about 219° C., which is a solder melting temperature, or higher (for example, about 230° C.) from the opening 41 to the fourth zone Z4. The fifth heater H5 supplies steam with a low temperature (for example, about 120° C.) near to 100° C., which is a dew condensation temperature, from the opening 51 to the fifth zone Z5. Also, the first heater H1 described above supplies air with a low temperature (for example, about 120° C., that is, the temperature somewhat higher than 100° C. (dew condensation boundary temperature), at which dew condensation of steam can be prevented) near to 100° C. from an opening 61 of a lower surface of the sixth zone (the furnace-outlet-side dew condensation prevention zone) Z6 adjacent to the downstream side of the fifth zone (the cooling zone) Z5. An upper surface of the sixth zone Z6 is formed with an opening 62 for discharging the air.

Atmospheric pressures of the zones Z2 to Z5 which are the superheated steam zones are equal or substantially equal to a standard atmospheric pressure (1 atmospheric pressure). On the other hand, atmospheric pressures of the first zone (the furnace-inlet-side dew condensation prevention zone) Z1 and the sixth zone (the furnace-outlet-side dew condensation prevention zone) Z6 are set at an atmospheric pressure (for example, 1.01 atmospheric pressure) somewhat higher than the atmospheric pressure of the second zone (the preheating zone) Z2 and the fifth zone (the cooling zone) Z5 which are equal or substantially equal to the standard atmospheric pressure (1 atmospheric pressure) as described above.

As such, in the heating furnace 2, the upstream side of the second zone (the preheating zone) Z2 and the downstream side of the fifth zone (the cooling zone) Z5 are respectively adjacently provided with the first zone (the furnace-inlet-side dew condensation prevention zone) Z1 and the sixth zone (the furnace-outlet-side dew condensation prevention zone) Z6 to which air with 100° C. or higher heated by the first heater H1 is supplied. The atmospheric pressures of the first zone Z1 and the sixth zone Z6 are set somewhat higher than the atmospheric pressures of the second zone Z2 and the fifth zone Z5. Consequently, the steam of the inside of the second zone Z2 or the fifth zone Z5 can be prevented from entering the first zone Z1 or the sixth zone Z6 and leaking from the inlet 10a or the outlet 10b to the outside of the heating furnace 2. That is, the first zone Z1 and the sixth zone Z6 function as an air curtain for preventing the steam of the inside of the superheated steam zone from leaking to the outside of the heating furnace 2. Without the function of the air curtain, when the steam of the inside of the heating furnace 2 leaks from the inlet 10a and the outlet 10b to the outside, the leaking steam may be exposed to the outside air and cooled. The leaking steam may touch on an outer surface of the heating furnace 2 to cause dew condensation, and this outer surface is waterlogged and is wetted. Also, the substrate S to be carried in the first zone Z1 from the inlet 10a is wetted. Such dew condensation makes it difficult to perform precise temperature control of the heating furnace 2 or proper heating of the substrate S as well as soiling the outer surface of the heating furnace 2.

Also, an air curtain effect similar to the above can be obtained by setting atmospheric pressures of the preheating zone Z2 and the cooling zone Z5 at 1 atmospheric pressure or lower (for example, 0.99 atmospheric pressure) and setting atmospheric pressures of the first zone Z1 and the sixth zone Z6 at an atmospheric pressure (for example, 1 atmospheric pressure equal to the standard atmospheric pressure) higher than 0.99 atmospheric pressure. In other words, the steam of the inside of the second zone Z2 or the fifth zone Z5 has only to be prevented from leaking to the outside of the heating furnace 2 by setting the atmospheric pressures of the first zone Z1 and the sixth zone Z6 relatively higher than the atmospheric pressures of the second zone Z2 and the fifth zone Z5.

In the present embodiment, the air is heated to 100° C. or higher by the first heater H1 and is fed and supplied to the first zone Z1 and the sixth zone Z6. Alternatively, instead of air, nitrogen gas may be heated to 100° C. or higher by the first heater H1 and be supplied to the first zone Z1 and the sixth zone Z6. This can more surely prevent oxidation of solder or the like at the time of movement in and out of the furnace. However, when nitrogen gas is used in this manner, the cost becomes high accordingly, but the amount of consumption of the nitrogen gas becomes much smaller than that of conventional nitrogen reflow.

The second heater H2 to the fifth heater H5 are connected to a steam generator 6 through a pipe line 5. The steam generator 6 is controlled by a first controller 7. The first heater H1 is controlled by a second controller 8. In addition, the side of the first heater H1 includes a fan for sending air to the first zone Z1 and the sixth zone Z6, and by controlling the number of rotations of the fan, the atmospheric pressures of the first zone Z1 and the sixth zone Z6 can be set higher than the atmospheric pressures of the second zone Z2 and the fifth zone Z5 as described above. The second heater H2 to the fifth heater H5 are controlled by a third controller 9.

Lower surfaces of the second zone Z2 to the fifth zone Z5 are formed with exhaust holes 22, 32, 42, 52. Each of the exhaust holes 22, 32, 42, 52 communicates with a water tank 71 via a pipe line 70. The middle of the pipe line 70 is provided with a cooler 72 and a flux remover 73. Consequently, steam discharged from each of the exhaust holes 22, 32, 42, 52 is cooled by the cooler 72 and is liquefied, and harmful flux is removed by the flux remover 73 and then, the steam is returned to the water tank 71. Water accumulated in the water tank 71 is drawn by a pump 74, and is returned to the steam generator 6 through a pipe line 75. Accordingly, the water can be used repeatedly. The middle of the pipe line 75 is provided with a valve 76 for adjusting water supply.

Figure 2:
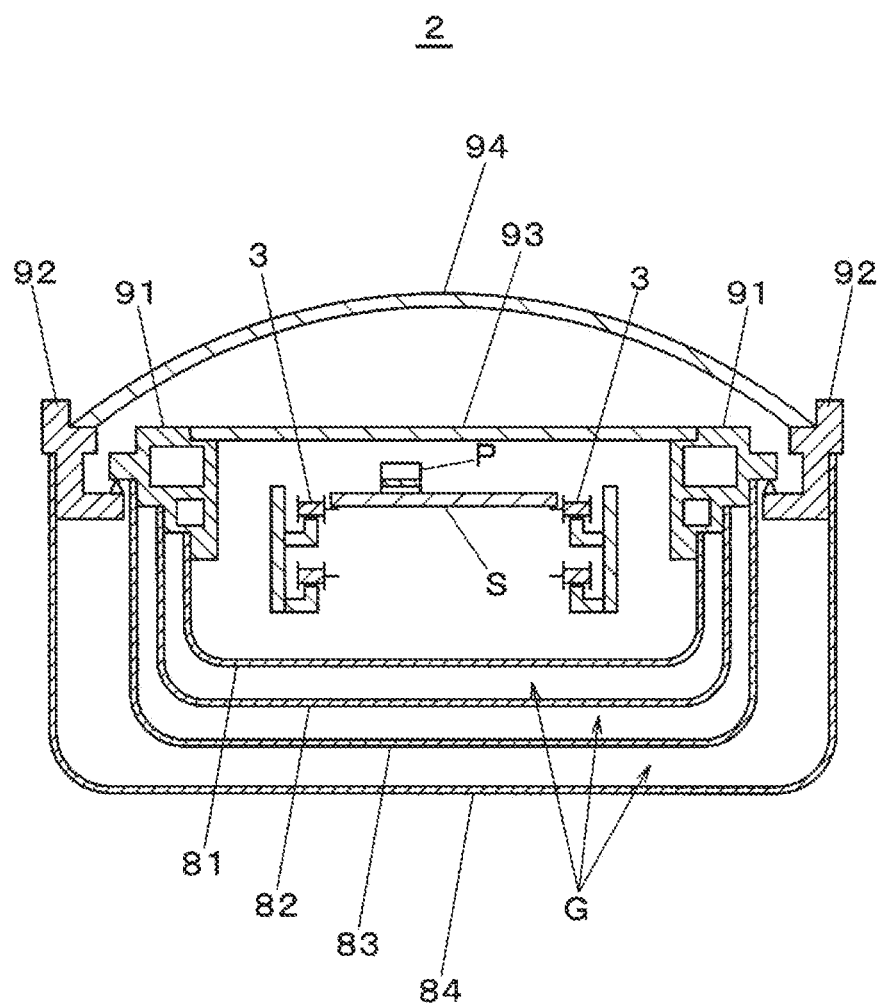
FIG. 2 is a sectional view of the steam reflow apparatus in one embodiment of the present invention.

FIG. 2 shows a cross section of the heating furnace 2. The heating furnace 2 is formed by stacking a plurality of box bodies 81, 82, 83, 84 formed by molding a sheet-shaped body in substantially a U shape, and a heat-insulated space G is formed between each of the box bodies 81, 82, 83, 84. The heat insulated space G may be internally formed with a heat insulating material. The upper end of each of the box bodies 81 to 84 is coupled to a pair of first right and left frames 91, 91 and a pair of second right and left frames 92, 92. A transparent plate 93 as a cover plate is attached between the first frames 91, 91. Also, an arch-shaped protective plate 94 which is a transparent plate is attached between the second frames 92, 92. A glass plate, a plastic plate, etc. can be applied to the protective plate 94 or the transparent plate 93 used as the cover plate of the ceiling of the heating furnace 2. In addition, the protective plate 94 is not limited to the arch shape, and other shapes (for example, a flat plate) may be adopted.

Since it is unnecessary for this steam reflow apparatus 1 to arrange a device such as a heater over the conveyor 3 which configures the substrate conveyance means, a ceiling plate of the heating furnace 2 is formed of the transparent plate 93 or the protective plate 94. Accordingly, a worker can directly visually identify an internal state of the heating furnace 2 from above in real time, particularly, whether or not the solder h is normally melted in the fourth zone (the melting zone) Z4, that is, whether or not soldering is normally performed, with the result that more proper operational management can be performed. Thus, in the heating furnace 2, the ceiling of at least the fourth zone (the melting zone) Z4 is desirably formed of the transparent plate capable of being visually identified from above. Also, the substrate S conveyed inside the heating furnace 2 by the conveyor 3 has trouble, for example, the substrate S falls from the conveyor 3, but one can easily visually identify the presence or absence of such trouble from above in this heating furnace 2.

Figure 3:
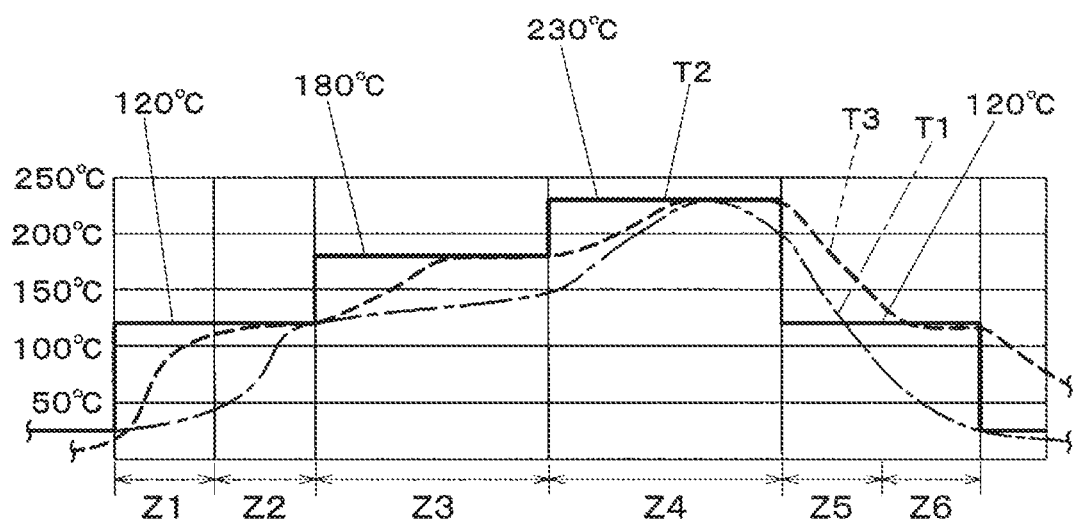
FIG. 3 is a temperature profile diagram of the steam reflow apparatus in one embodiment of the present invention.

FIG. 3 shows a temperature profile of each of the zones Z1 to Z6 of the heating furnace 2. The temperature profile shown by a chain line T1 is an ideal (target) temperature profile for soldering. The temperature profile shown by a thick line T2 is a temperature profile of an ambient temperature of each of the zones Z1 to Z6 implemented by each of the heaters H1 to H5. The temperature profile shown by a broken line T3 is an actual temperature profile of the substrate S heated by the ambient temperature of each of the zones Z1 to Z6. Consequently, by the ambient temperature of each of the zones Z1 to Z6 implemented by each of the heaters H1 to H5, the actual temperature profile T3 of the substrate S is desirably brought nearest to the ideal temperature profile T1. FIG. 1 also shows the ideal temperature profile T1 and the actual temperature profile T3 of the substrate S for easy understanding.

This steam reflow apparatus 1 includes the configuration as described above. Subsequently, reflow steps will be described with reference to FIGS. 1 and 3. In FIG. 1, the substrate S with ordinary temperature is carried in the first zone Z1 from the inlet 10a (is moved in the heating furnace 2), and is heated to 100° C. or higher capable of preventing dew condensation by air heated by the first heater H1 (a furnace-inlet-side dew condensation prevention step). After the substrate S is heated in the air to 100° C. (dew condensation temperature) or higher in the first zone Z1 in this manner, the substrate S is carried in the second zone Z2 which is the first steam zone. Then, since the substrate S is continuously heated to about 120° C. by superheated steam by the second heater H2 (a preheating step), the steam can be prevented from touching the substrate S and causing dew condensation (liquefaction) on a surface of the substrate in the second zone Z2.

Then, the substrate S is carried in the third zone Z3, and is further heated to about 180° C. (150° C. or higher) nearer to about 219° C., which is a melting point of solder, by the superheated steam heated by the third heater H3 (a uniform heating step).

Then, the substrate S is carried in the fourth zone Z4, and is rapidly heated to about 230° C. higher than or equal to the melting point (about 219° C.), which is a melting temperature of the solder, by the superheated steam heated by the fourth heater H4 and thereby, the solder is melted (a melting step).

Then, the substrate S is carried in the fifth zone Z5, and is cooled to a temperature (for example, about 120° C.) near to 100° C. by the superheated steam heated by the fifth heater H5, and the solder h becomes the solder melting point or lower to thereby be solidified (a cooling step by the superheated steam).

Then, after the substrate S is conveyed in a zone of air with 100° C. or higher (for example, about 120° C.) heated by the first heater H1 (a furnace-outlet-side dew condensation prevention step), the substrate S is carried out of the outlet 10b to the outside of the heating furnace 2. As a result, dew condensation is not caused since the substrate has the temperature of 100° C. or higher from the steam zone to the air zone. The time necessary for the substrate S to pass through all the zones Z1 to Z6 (all the time necessary for steam reflow) can be shortened to, for example, about 150 seconds, and is extremely shorter than that of conventional air reflow or nitrogen reflow. Consequently, the whole length of the heating furnace can be decreased to implement the compact reflow apparatus.

The present invention is particularly useful as a reflow apparatus and a reflow method for soldering an electronic component on an electrode of a substrate by solder such as lead-free solder.

What is claimed is:

1. A steam reflow apparatus comprising:
   a heating furnace including a preheating zone, a uniform heating zone, a melting zone and a cooling zone to which superheated steams are respectively supplied;
   a substrate conveyor which conveys a substrate inside the heating furnace, wherein an electronic component on an electrode of the substrate is soldered while the substrate is conveyed;
   a furnace-inlet-side dew condensation prevention zone and a furnace-outlet-side dew condensation prevention zone respectively adjacently provided with an upstream side of the preheating zone and a downstream side of the cooling zone, wherein air or nitrogen gas at 100° C. or higher heated by a heater is supplied to the furnace-inlet-side dew condensation prevention zone and the furnace-outlet-side dew condensation prevention zone; and
   a fan which sends the air or the nitrogen gas heated by the heater to an inside of the furnace-inlet-side dew condensation prevention zone and the furnace-outlet-side dew condensation prevention zone, wherein
   an atmospheric pressure of the furnace-inlet-side dew condensation prevention zone having an inlet of the substrate and an atmospheric pressure of the furnace-outlet-side dew condensation prevention zone having an outlet of the substrate are set higher than an atmospheric pressure of the preheating zone and an atmospheric pressure of the cooling zone by controlling a number of rotations of the fan.

2. A steam reflow method comprising soldering while conveying a substrate, on which an electronic component is mounted, with the following procedures:
   heating the substrate, on which the electronic component is mounted, carried in from an inlet to 100° C. or higher by air or nitrogen gas heated by a first heater and sent by a fan to achieve a furnace-inlet-side dew condensation prevention;
   heating the substrate by superheated steam at 100° C. or higher heated by a second heater to achieve a preheating;
   further heating the substrate to 150° C. or higher by superheated steam heated by a third heater to achieve a uniform heating;
   heating the substrate to a solder melting temperature or higher by superheated steam heated by a fourth heater and melting solder to achieve a melting;
   cooling the substrate by superheated steam heated by fifth a heater to achieve a cooling;
   cooling the substrate by air or nitrogen gas heated by the first heater and sent by the fan to achieve a furnace-outlet-side dew condensation prevention; and
   carrying the substrate out of an outlet, wherein
   an atmospheric pressure during the furnace-inlet-side dew condensation prevention and an atmospheric pressure during the furnace-outlet-side dew condensation prevention are set higher than an atmospheric pressure during the preheating and an atmospheric pressure during the cooling by controlling a number of rotations of the fan.

3. The steam reflow apparatus according to claim 1, wherein each of the furnace-inlet-side dew condensation prevention zone and the furnace-outlet-side dew condensation prevention zone includes a lower opening formed in a lower surface and an upper opening formed in an upper surface, and the air or the nitrogen gas heated by the heater and sent by the fan is supplied from the lower opening and discharged from the upper opening.

4. The steam reflow apparatus according to claim 3, wherein each of the preheating zone, the uniform heating zone, the melting zone and the cooling zone includes an upper opening formed in an upper surface and an exhaust hole formed in a lower surface, and steam is supplied from the upper opening and exhausted from the exhaust hole.

5. The steam reflow method according to claim 2, wherein the air or the nitrogen gas heated by the heater and sent by the fan is supplied from a lower opening and discharged from an upper opening in each of a furnace-inlet-side dew condensation prevention zone in which the furnace-inlet-side dew condensation prevention is performed and a furnace-outlet-side dew condensation prevention zone in which the furnace-outlet-side dew condensation prevention is performed.

6. The steam reflow method according to claim 5, wherein steam is supplied from an upper opening and exhausted from an exhaust hole in each of the preheating zone, the uniform heating zone, the melting zone and the cooling zone.

* * * * *